United States Patent
Stewart et al.

(10) Patent No.: US 6,339,612 B1
(45) Date of Patent: *Jan. 15, 2002

(54) METHOD AND APPARATUS FOR JOINT DETECTION OF DATA IN A DIRECT SEQUENCE SPREAD SPECTRUM COMMUNICATIONS SYSTEM

(75) Inventors: Kenneth A. Stewart, Rolling Meadows; Yi Qiao, Chicago, both of IL (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/020,970

(22) Filed: Feb. 9, 1998

(51) Int. Cl.[7] .............................................. H04L 27/30
(52) U.S. Cl. ........................ 375/140; 375/149; 375/150; 370/342; 455/65
(58) Field of Search ................................ 375/343, 346, 375/368, 295, 233, 140, 150, 149; 370/330, 323, 342

(56) References Cited

U.S. PATENT DOCUMENTS

| | | | | |
|---|---|---|---|---|
| 4,425,639 A | * | 1/1984 | Acampora et al. | 370/323 |
| 5,291,475 A | * | 3/1994 | Bruckert | 370/330 |
| 5,506,861 A | | 4/1996 | Bottomley | 320/441 |
| 5,542,101 A | * | 7/1996 | Pal | 455/65 |
| 5,790,598 A | * | 10/1999 | Moreland et al. | 375/233 |
| 5,970,060 A | * | 10/1999 | Bailer et al. | 370/342 |

OTHER PUBLICATIONS

Blanz, et al., Multi–User Direction of Arrival and Channel Estimation for Time–Slotted CDMA with Joint Detection, IEEE, DSP 97, p. 375–378, Jun. 1997.*

Isaacson et al., Analysis of Numerical Method, Dover Publication, Inc., pp. 97–99, 1994.*

Lupas R., Verdu S., "Linear Multiuser Detectors for Synchronous Code Division Multiple Access Channels", IEEE Trans. Inf. Theory, vol. 35, No. 1, Jan. 1989.

Klein A., Baier P.W., "Linear Unbiased Data Estimation in Mobile Radio Systems Applying CDMA", IEEE J. Sel. Areas Comm., vol. 11, No. 7, Sep. 1993.

Blanz J., Klein A., Nashan M., Steil A., "Performance of a Cellular Hybrid C/TDMA Mobile Radio System Applying Joint Detection and Coherent Receiver Antenna Diversity", IEEE J. Sel. Areas Comm. vol. 12, No. 4, May 1994.

Jung P., "Joint Detection with Coherent Receiver Antenna Diversity in CDMA Mobile Radio Systems", IEEE Trans. Veh. Tech., vol. 44, No. 1, Feb. 1995.

Steiner B., Jung P., "Optimum and Sub–optimum Channel Estimation for the Uplink of CDMA Mobile Radio Systems with Joint Detection", by European Trans. Telecom., vol. 5, Jan.–Feb. 1994.

* cited by examiner

*Primary Examiner*—Stephen Chin
*Assistant Examiner*—Shuwang Liu
(74) *Attorney, Agent, or Firm*—Kenneth A. Haas

(57) ABSTRACT

Joint detection of data signals occurs in a code division, multiple access (CDMA) communication system as follows: A digital signal processor (315) first extracts a midamble portion of transmitted signal vectors and generates an estimate of the channel response corresponding to each user-antenna pair using a channel estimator (401). In the preferred embodiment, each user's transmission within the communication system comprises either the type-1 or type-2 burst with varying midamble and guard period durations. Next, a convolution processor (402) forms the convolution of the user signature sequence with the channel impulse response estimate associated with each user and each of the antennas (308)–(310). A detector (403) utilizes the set of vectors and creates a set of sub-system matrices and solves the sub-system matrices to extract symbol information from an individual remote unit's transmission. Finally, the detector (403) outputs symbol information for subsequent infrastructure processing.

3 Claims, 4 Drawing Sheets

METHOD AND APPARATUS FOR JOINT DETECTION OF DATA IN A DIRECT SEQUENCE SPREAD SPECTRUM COMMUNICATIONS SYSTEM

FIELD OF THE INVENTION

The present invention relates generally to joint detection of data signals and, in particular, to joint detection of data symbols simultaneously transmitted over a shared communications channel and distinguished by user-specific signature or spreading sequences.

BACKGROUND OF THE INVENTION

Since the early 1990's, code division, multiple access (CDMA) cellular communications systems have been designed based on direct-sequence spread-spectrum (DS-SS) principles. In such systems, multiple users simultaneously occupy the same radio frequency channel, separated only by user-specific spreading or signature sequences. Probably the best known contemporary example of this approach to cellular system design is that defined by Personal Station-Base Station Compatibility Requirements for 1.8 to 2.0 GHz CDMA Personal Communication Systems" (American National Standards Institute (ANSI) J-STD-008), or, broadly equivalently, the Telecommunications Industry Association Interim Standard 95 (TIA IS-95).

Recently, proposals for so-called "3-rd Generation" cellular communication systems have been made to the European Telecommunications Standards Institute (ETSI) for adoption within the Universal Mobile Telecommunications System (UMTS) standardization process. Among the proposals are systems based on Direct-Sequence, Spread-Spectrum (DS-SS) technology. One such candidate system, which is particularly relevant to the present invention, is usually referred to in the UMTS community as the TD-CDMA system (for "Time-Division Code-Division Multiple Access"). That system makes use of a combination of time- and code-division techniques as a means of improving overall system capacity while purportedly retaining compatibility with $2^{nd}$ Generation systems, notably the Group Special Mobile (GSM) cellular communications system.

As can be seen from FIG. 1, the TD-CDMA air interface incorporates both TDMA and CDMA elements. The TDMA component is provided by dividing each radio frequency channel into frames of 4.615 ms duration, with each frame further divided into time slots of approximately 577 us in length. The CDMA element is permitted by the allocation to each user of a unique 16-ary Walsh-Hadamard orthogonal spreading code which is used to spread the Quadrature Phase Shift Keyed (QPSK) or Quadrature Amplitude Modulation (16-QAM) data symbol sequences comprising the useful part of each user's transmission.

The mobile station (MS) or base station (BS) transmission within any timeslot is referred to a 'burst'. As presently envisaged, the TD-CDMA air interface supports two distinct burst types, the general structure of which is shown in FIG. 1. The so-called type-1 burst transmits a data sub-burst of 28 data symbols, followed by a midamble of length 296 chips (used for channel estimation purposes), a second sub-burst of 28 data symbols, and finally a guard period of 58 chips; the type-2 burst transmits 34 symbols in each sub-burst, with midamble and guard period durations of 107 and 55 chips respectively. In both cases the length of each burst is 1250 chips. The same burst structures are used for both forward and reverse links, although since the forward link represents a point-multipoint transmission, the content of the midamble segment is slightly different in that case. This is of no consequence, however, for the present purposes. Accordingly, the description of the drawings below will focus on reverse link operation, pointing out differences between the forward and reverse only when these are significant for the description of the invention.

FIG. 2 shows a communication system employing a TD-CDMA air interface. A single timeslot is shown by the figure, within which K mobile stations 201–209 are simultaneously active. In the example shown, the mobile station population 201–209 transmits simultaneously on a specific timeslot, distinguished by length-16 spreading codes $c^{(1)}$ through $c^{(k)}$ respectively. It is important to note that—unlike IS-95 systems in which the sequence used to spread each symbol is a sub-sequence of a much longer sequence—the same code $c^{(k)}$ is used continuously to spread each data symbol from the same user. In other words, the received signal at BS 200 comprises a plurality of time overlapping coded signals from individual mobile stations, each transmitted within the same timeslot and distinguishable by a specific signature sequence.

The use of conventional DS-SS receivers such as the RAKE receiver is not, however, envisaged for use in the TD-CDMA system. Rather, receiver designs capable of simultaneously or jointly recovering the data symbols transmitted by the population of mobile stations operating within the same timeslott frequency within a given cell or sector are intended. Examples of such receivers are described in articles Lupas R., Verdu S., "Linear Multiuser Detectors for Synchronous Code-Division Multiple-Access Channels", IEEE Trans. Inf. Theory, vol. 35, no. 1, January 1989, Klein A., Baler P. W., "Linear Unbiased Data Estimation in Mobile Radio Systems Applying CDMA", IEEE J. Sel. Areas Comm., vol. 11, no. 7, September 1993, Blanz J., Klein A., Nashan M., Steil A., "Performance of a Cellular Hybrid C/TDMA Mobile Radio System Applying Joint Detection and Coherent Receiver Antenna Diversity", IEEE J, Sel. Areas Comm., vol. 12. No. 4, May 1994, and Jung P., "Joint Detection with Coherent Receiver Antenna Diversity in CDMA Mobile Radio Systems", IEEE Trans. Veh. Tech., vol. 44, no. 1, February 1995.

The receivers described in the above-mentioned references perform joint detection using block linear joint sequence detectors. The computational complexity of the methods used to solve the system of equations arising from the above methods can, however, be very large. This results in receivers that are costly and consume large amounts of power. Therefore, a need exists for a method and apparatus for joint detection of data signals that requires less computational complexity, resulting in less costly, lower power receivers.

Put more generally, a need exists for a method and apparatus to reduce the computational complexity of linear joint detectors where the signature sequences of the users are constant over a block (or burst) of symbols, and where some external means are provided—in the form, for example, of a midamble or pilot sequence—for performing channel estimation.

DETAILED DESCRIPTION OF THE DRAWINGS

Although the following description relates to the candidate UMTS TD-CDMA system, it will be readily appreciated that the invention may apply to any CDMA system in which the signature sequences assigned to each user do not change from symbol to symbol over some fixed interval of time, and where some means of channel estimation are provided. For the particular TD-CDMA example, the interval is the burst (or more precisely, the sub-burst) and the midamble provides the means of channel estimation.

Joint detection of data signals according to the invention in such a CDMA communication system proceeds generally as follows. A digital signal processor (DSP) first extracts the midamble portion of the burst (FIG. 1) received on each antenna and generates, using the channel estimation function, an estimate of the complex-valued channel impulse response defined from each user to each antenna. Next, the DSP forms the convolution of the assigned user signature sequences with the channel impulse response estimate associated with each user and each antenna. A detector, as described by the detailed description of the invention below, then utilizes the resulting set of convolved signal vectors to create a system of sub-matrices and then solves that system of sub-matrices in order to extract the underlying modulated data symbol information from each user. The detector outputs soft-decision symbol information for use in subsequent error control decoding. Unlike prior-art detectors, creating the system of sub-matrices to extract the data symbol soft decision information results in less computational complexity than the direct approaches of the references mentioned above, resulting in receivers which are less costly and consume lower amounts of power compared to the prior-art joint detection receivers.

Figure 3:
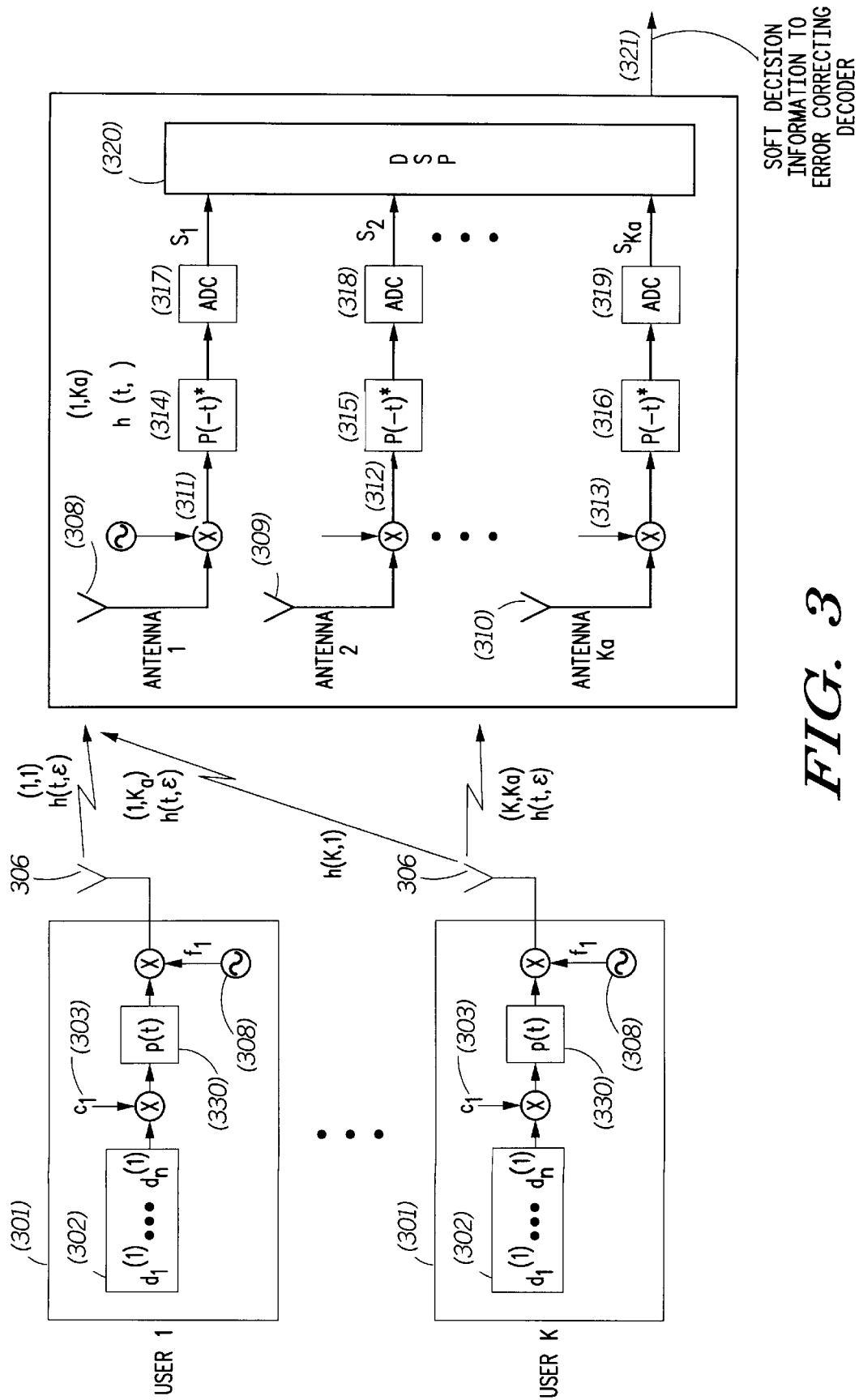
FIG. 3 is a block diagram of a mobile station and base station illustrating transmission and reception of signals in the TD-CDMA communication system of FIG. 2 in accordance with the preferred embodiment of the present invention.

Now, in more detail, FIG. 3 illustrates a general signal model within which the present invention may be described. In the preferred embodiment of the present invention each user (an example of which is mobile station 301) utilizes a particular 16-ary spreading sequence 303 to spread each of the symbols 302 transmitted within a burst (i.e. each data sub-burst of FIG. 1), although any spreading sequence length may be used. This is distinct from existing DS-SS cellular communications systems such as J-STD-008 or IS-95, in which both short and long codes have repetition intervals that are much greater than the symbol duration. Note that FIG. 3 shows only transmission of the first sub-burst of the burst of FIG. 1 since this is all that is necessary for description of the preferred embodiment. Transmission of the user midamble sequences and data sub-burst 2 is implicit.

Returning to FIG. 3, during a specific timeslot, the first mobile station 301 transmits a sequence of N complex-valued symbols 302 with each symbol spread using spreading sequence $c^{(1)}$ 303. The spread signal is then filtered by a chip pulse-shaping filter p(t) 330, frequency-converted to carrier frequency $f_1$ using frequency converter 305, and transmitted by antenna 306. All the K-1 other mobile stations behave similarly, using codes $c^{(2)}$ through $c^{(k)}$, respectively.

BS 200 supports spatially diverse signal reception by providing $K_a$ widely separated antennas 308–310, which may be omni-directional or sectored antennas. Since BS 200 provides $K_a$ antennas, a set of $K.K_a$ baseband-equivalent radio-frequency channels may be defined, with channel $h^{(k,ka)}(t,\tau)$ describing the complex channel impulse response linking mobile station k to base station antenna $k_a$. (Assuming mobile stations have only a single antenna, the case of forward link transmission is obtained by simply setting $K_a=1$).

The signal received on base station antenna 308 is frequency converted to complex baseband form by mixer 311 and then processed by chip pulse matched filter 314 before being sampled by a quadrature analog-digital converter (ADC) 317. The sampled signal is subsequently distributed to Digital Signal Processor (DSP) 320 where the present invention is located. The signals received from other antennas 309–310 are similarly converted to sampled baseband signals for distribution to DSP 320. In the preferred embodiment of the present invention ADC 317 operates at the chip rate, i.e. at $1/T_c$ sample rate, although it will be obvious that the invention may be easily extended to include oversampling designs in which the ADC samplerate is $p/T_c$ where p is an integer oversampling rate.

In the preferred embodiment of the present invention mobile station transmit timing correction (similar to that employed in the GSM cellular communication system) is employed for the reverse link of the TD-CDMA system such that the bursts of the K simultaneously active users are observed quasi-synchronously at the BS receiver. That is, the bursts are received at the BS receiver aligned in time except for a timing error of the order of a fraction of the symbol duration $T_s$, or equivalently of the order of a few chips duration.

Figure 1:
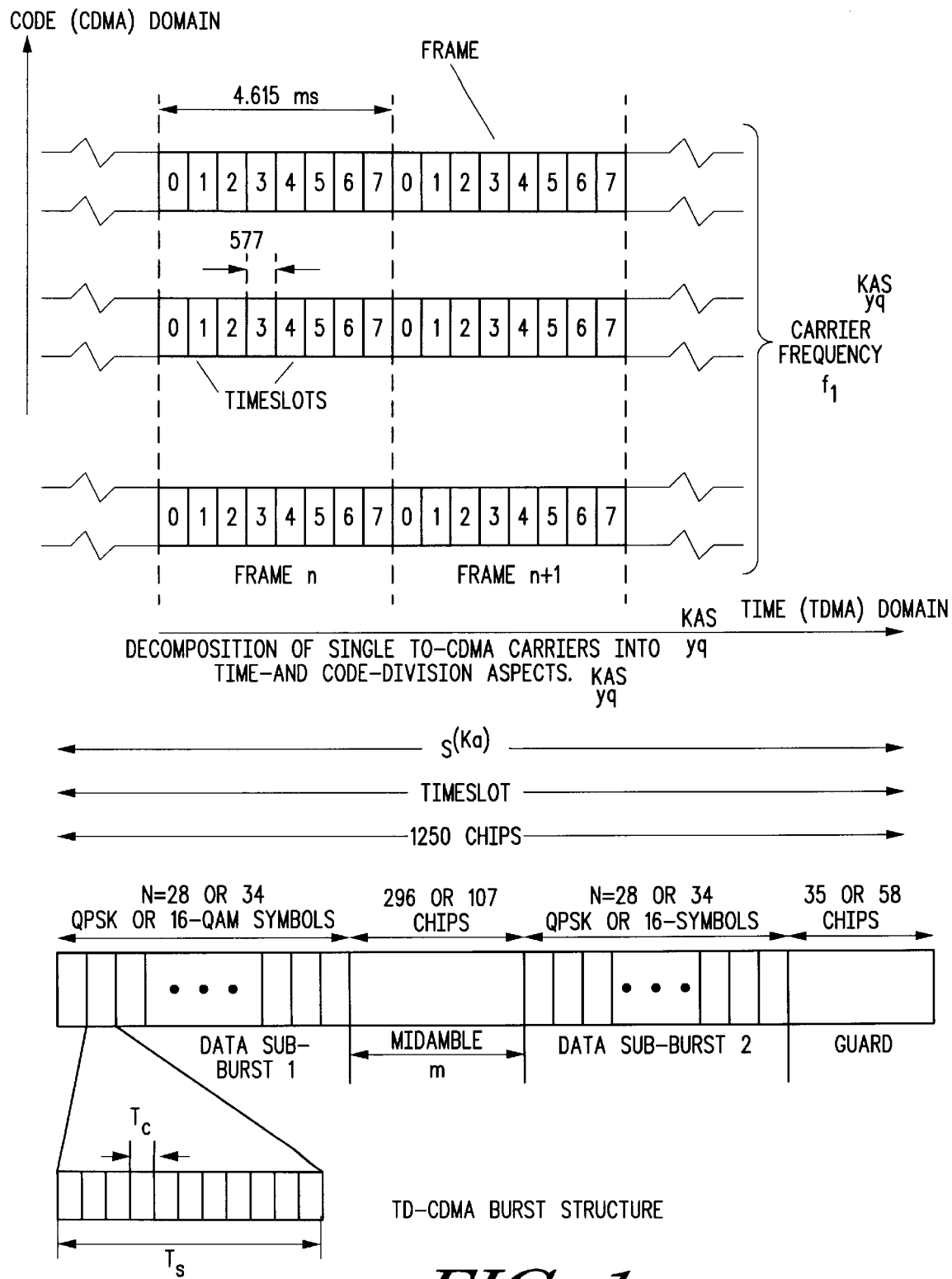
FIG. 1 illustrates a prior-art Time-division, Code-division Multiple Access (TD-CDMA) air interface incorporating both Time Division Multiple Access (TDMA) and Code Division Multiple Access (CDMA) elements.
Figure 2:
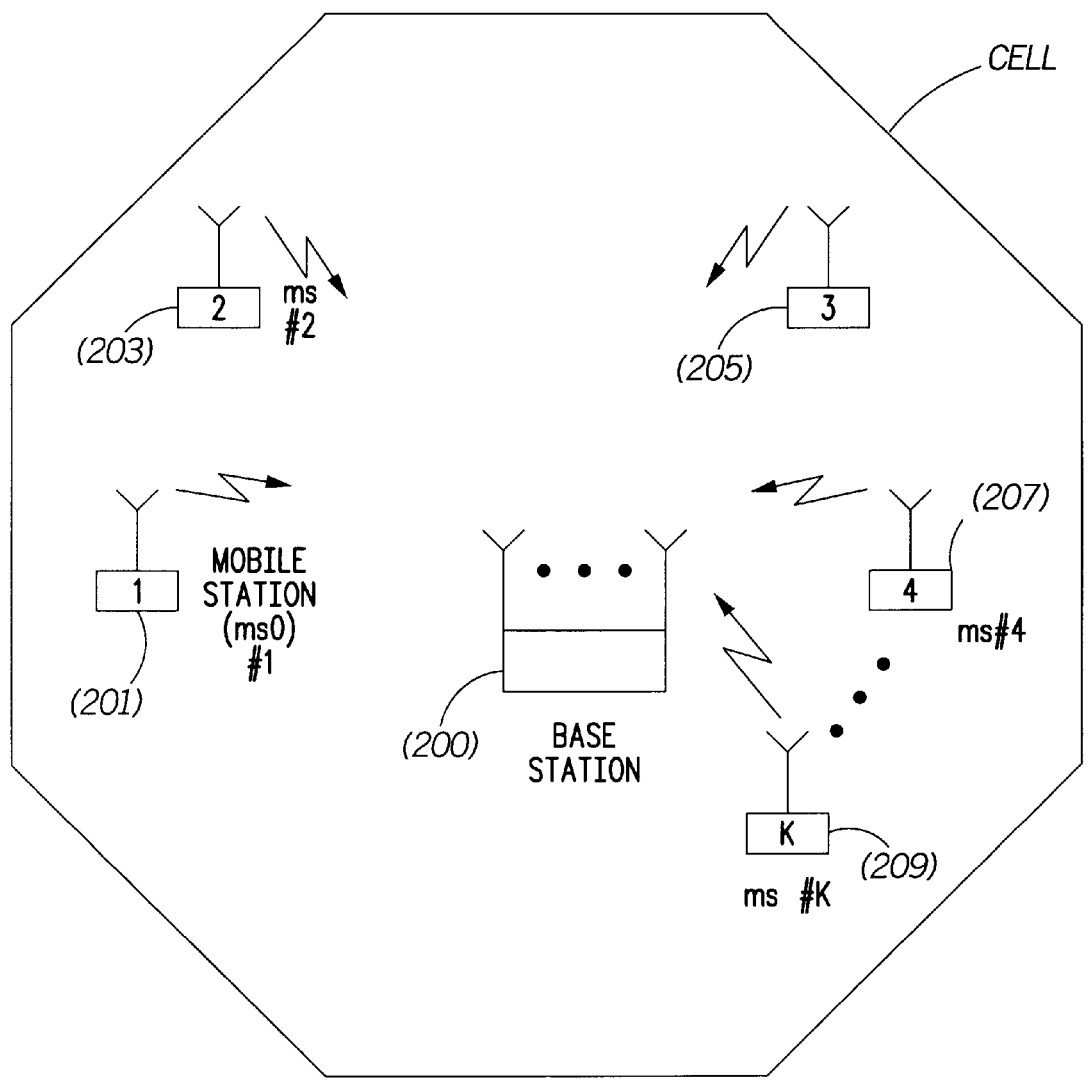
FIG. 2 is a block diagram of a communication system utilizing the TD-CDMA air interface of FIG. 1 for a single timeslot.

Accordingly, ADC's 317–319 may be configured to sample (at chip spacing) the nominal received burst interval corresponding to the burst structure of FIG. 1, with any residual timing error incorporated simply as a shift in the channel estimate. As a result, data symbol recovery for each timeslot may be performed by examining the length-1250 (as stated above the timeslot duration is 1250 chips) complex-valued baseband signals $s^{(ka)}$ recovered from each antenna, and which span the duration of the received timeslot. The extent of the received signal $s^{(ka)}$ is shown in FIG. 1.

Figure 4:
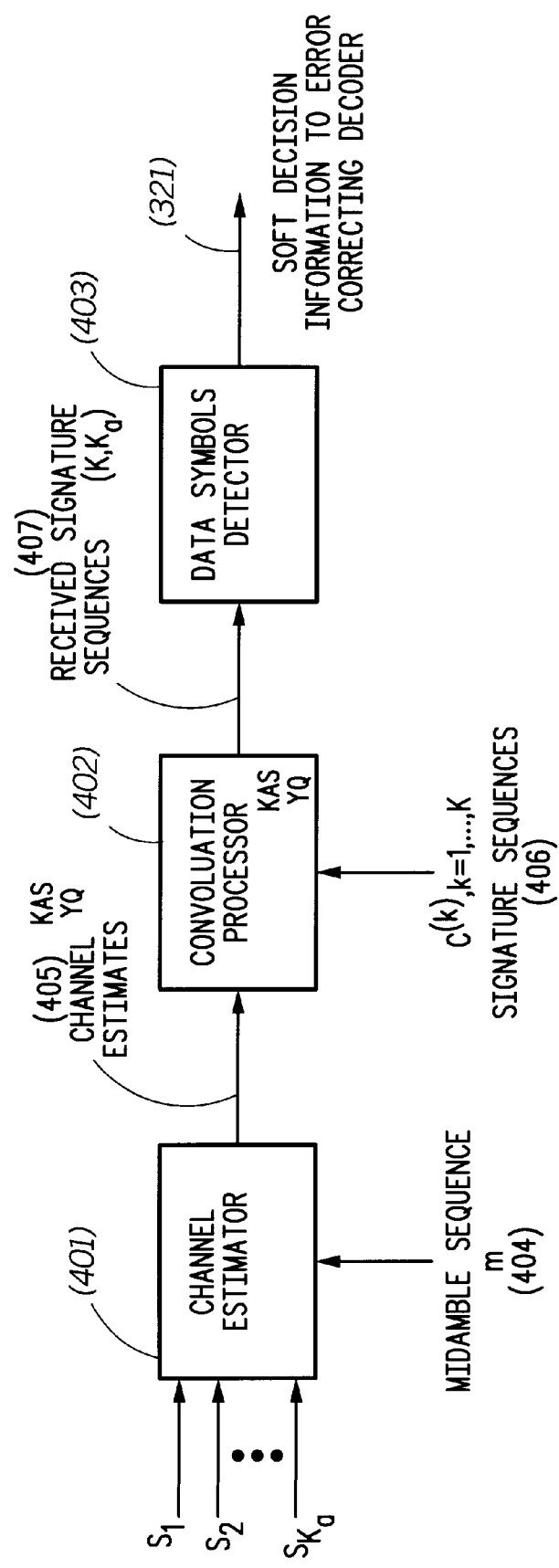
FIG. 4 is a block diagram of the digital signal processor of FIG. 3 in accordance with the preferred embodiment of the present invention.

FIG. 4 is a block diagram of DSP 320 in accordance with the preferred embodiment of the present invention. The blocks indicate specific functions to be implemented, mapped onto a programmable DSP with possibly multiple ALU's, or onto an application-specific VLSI device. In the preferred embodiment of the present invention DSP 320 would be a DSP such as a Texas Instruments TMSC320C80 or TMSC320C60 processor, or some other suitable programmable DSP.

DSP 320 first extracts the midamble portion of the received signal vectors $s^{(ka)}$ and generates an estimate within channel estimator 401 of the channel $h^{(k,ka)}(t,\tau)$ corresponding to each user-antenna pair by making use of the known midamble sequence m (see FIG. 1). This operation may be done using a variety of known channel estimation methods, including matched filtering, or periodic inverse filtering such as the approach described in Steiner B., Jung P., "Optimum and Sub-optimum Channel Estimation for the Uplink of CDMA Mobile Radio Systems with Joint Detection", by European Trans. Telecom., vol. 5, January–February 1994. The output of the channel estimator 401 is a set of $K.K_a$ channel impulse response estimates, available at $T_c$-spacing, of length-W and represented by the vectors:

$$h^{(k,ka)} = (h_1^{(k,ka)}, h_2^{(k,ka)}, \ldots, (h_W^{(k,ka)})^T \quad (1)$$

where T is the transposition operator.

Next, in the convolution block 402, the DSP 320 forms the convolution of each known user signature sequence $c^{(k)}$ with the channel impulse response estimate associated with each user-antenna pair. That is, the convolution block 402 forms the convolution of the channel estimate $h^{(k,ka)}$ with the each code vector $c^{(k)}$ (for $k_a=1, \ldots, K_a$) to generate a set of $K.K_a$ vectors:

$$b^{(k,ka)} = (b_1^{(k,ka)}, b_2^{(k,ka)}, \ldots, b_{Q+W-1}^{(k,ka)})^T = h^{(k,ka)} * c^{(k)} \quad (2)$$

This set of $K.K_a$ vectors then enter the data symbol detector 403.

In order to describe the invention, consider demodulation of only the length-N data sequence comprising the first sub-burst of the burst structure illustrated in FIG. 1. Demodulation of the second sub-burst is performed in similar fashion and so need not be described separately.

Say the desired length-N transmitted data sequence for sub-burst 1 of user k is denoted by the vector $d^{(k)}$:

$$d^{(k)} = (d_1^{(k)}, d_2^{(k)}, \ldots, d_N^{(k)})^T, \; n=1, \ldots, N \quad (3)$$

where the complex data symbols are taken from an M-ary alphabet $V = \{v_1, v_2, \ldots, v_M\}$. Any alphabet may be used in theory, although in practice the TD-CDMA system proposes 4-ary (QPSK) or rectangular 16-ary (16-QAM) alphabets. Introducing a transmitted symbol vector as $$d = (d_1^T, d_2^T, \ldots, d_N^T)^T \quad (4)$$

where $$d_n = (d_n^{(1)}, d_n^{(2)}, \ldots, d_n^{(K)})^T, \; n=1, \ldots, N, \quad (5)$$

By constructing a sub-system equation (will be described in detail later) as:

$$u_n = \begin{cases} A_1 d_n^+ w_n, & n = 1, \cdots, N-1 \\ A_{B,1} d_n^+ w_n, & n = N \end{cases} \quad (6)$$

decoder 403 utilizes the sub-system to solve for $d_n$ in order to recover the data symbols $d_n^{(k)}, n=1, \ldots, N$ transmitted by MS k.

The description of a preferred embodiment of the present invention will be outlined in three parts, covering:

1. Generation of the Sub-System Equation (Eq.(6));
2. Solving the Sub-System Equation for $d_n$ Using a Forward Propagation Multiuser Joint Detection Technique (FPMJD); and
3. Solving the Sub-System Equation for $d_n$ Using a Forward-Backward Propagation Multi-User Joint Detection (FBPMJD) technique.

Generation of the Sub-System Equation

As discussed above, each of the data symbols $d_n^{(k)}, n=1, \ldots, N$ transmitted by MS k is spread by user-specific signature sequence:

$$c^{(k)} = (c_1^{(k)}, c_2^{(k)}, \ldots, c_Q^{(k)})^T \quad (7)$$

consisting of $Q_1$ generally complex-valued chips at chip interval $T_c$.

At antenna $k_a$, the $T_c$-spaced signal observation over the duration of the symbol sequence $d^{(k)}$ is denoted by vector $e^{(ka)}$, of length $NQ+W-1$.

$$e^{(ka)} = (e_1^{(ka)}, e_2^{(ka)}, \ldots, e_{(NQ+W-1)}^{(ka)})^T, \; k_a=1, \ldots, K_a \quad (8)$$

With a total of $K_a$ antennas, an overall, concatenated signal observation can be denoted by the vector e, $$e = (e^{(1)T}, e^{(2)T}, \ldots, e^{(K_a)T})^T \quad (9)$$

where $e^{(ka)}, k_a=1, \ldots, K_a$ is given in Eq.(8).

In addition to the spread signal components, vector e also contains internally generated receiver thermal noise as well as channel interference due to users in different cells. These signal components are denoted by the vector n, $$n = (n^{(1)T}, n^{(2)T}, \ldots, n^{(K_a)T})^T \quad (10)$$

where $$n^{(ka)} = (n_1^{(ka)}, n_2^{(ka)}, \ldots, n_{(NQ+W-1)}^{(ka)})^T, \; k_a=1, \ldots, K_a \quad (11)$$

Now, as a starting point in efficiently partitioning the detection problem, decoder 403 defines a matrix partition parameter as, $$p = \left\lceil \frac{Q+W-1}{Q} \right\rceil \quad (12)$$

Decoder 403 then creates a set of subsystem matrices as:

$$A_m^{(ka)} = \begin{bmatrix} b_{(m-1)Q+1}^{(1,ka)} & b_{(m-1)Q+1}^{(2,ka)} & \cdots & b_{(m-1)Q+1}^{(K,ka)} \\ b_{(m-1)Q+2}^{(1,ka)} & b_{(m-1)Q+2}^{(2,ka)} & \cdots & b_{(m-1)Q+2}^{(K,ka)} \\ \vdots & \vdots & \vdots & \vdots \\ b_{mQ}^{(1,ka)} & b_{mQ}^{(2,ka)} & \cdots & b_{mQ}^{(K,ka)} \end{bmatrix} \; 1 \leq m < p \quad (13)$$

The p-th submatrix $A_p^{(ka)}$ is created by defining a zero-padding operator $T_A$ defined as:

$$T_A = \begin{bmatrix} I_{((2-p)Q+W-1) \times ((2-p)Q+W-1)} \\ 0 \end{bmatrix}_{Q \times ((2-p)Q+W-1)} \quad (14)$$

and then defining the submatrix $A_p^{(ka)}$ created by decoder 403 as:

$$A_p^{(ka)} = T_A \begin{bmatrix} b_{(p-1)Q+1}^{(1,ka)} & b_{(p-1)Q+1}^{(2,ka)} & \cdots & b_{(p-1)Q+1}^{(K,ka)} \\ b_{(p-1)Q+2}^{(1,ka)} & b_{(p-1)Q+2}^{(2,ka)} & \cdots & b_{(p-1)Q+2}^{(K,ka)} \\ \vdots & \vdots & \vdots & \vdots \\ b_{Q+W-1}^{(1,ka)} & b_{Q+W-1}^{(2,ka)} & \cdots & b_{Q+W-1}^{(K,ka)} \end{bmatrix} \quad (15)$$

Similarily, decoder 403 creates a series of submatrices related to the last symbol vector $d_N$ determination beginning from:

$$A_{B,1}^{(ka)} = \begin{bmatrix} b_1^{(1,ka)} & b_1^{(2,ka)} & \cdots & b_1^{(K,ka)} \\ b_2^{(1,ka)} & b_2^{(2,ka)} & \cdots & b_2^{(K,ka)} \\ \vdots & \vdots & \vdots & \vdots \\ b_{Q+W-1}^{(1,ka)} & b_{Q+W-1}^{(2,ka)} & \cdots & b_{Q+W-1}^{(K,ka)} \end{bmatrix} \quad (16)$$

and then using operator $$T_B = \begin{bmatrix} 0 & I_{Q \times Q} \\ 0 & 0 \end{bmatrix}_{(Q+W-1) \times (Q+W-1)} \quad (17)$$

to form $$A_{B,m}^{(ka)} = T_B A_{B,m-1}^{(ka)}, \ m = 2, \ldots, p \quad (18)$$

The sub-matrices $A_m^{(ka)}$, $m=1, \ldots, p$ have dimension $Q \times K$, and $A_{B,m}^{(ka)}$, $m=1, \ldots, p$ have dimension $(Q+W-1) \times K$, respectively.

By constructing a $K_a(NQ+W-1) \times KN$ matrix $A$ as:

$$A = (A^{(1)T}, A^{(2)T}, \ldots, A^{(K_a)T})^T, \quad (19)$$

where $$A^{(k_a)} = \begin{bmatrix} A_1^{(k_a)} & 0 & 0 & \cdots & 0 & 0 & \cdots & 0 & 0 \\ A_2^{(k_a)} & A_1^{(k_a)} & 0 & \cdots & 0 & 0 & \cdots & 0 & 0 \\ A_3^{(k_a)} & A_2^{(k_a)} & A_1^{(k_a)} & \cdots & 0 & 0 & \cdots & 0 & 0 \\ \vdots & \vdots & \vdots & \vdots & \vdots & \vdots & \vdots & \vdots \\ A_p^{(k_a)} & A_{p-1}^{(k_a)} & A_{p-2}^{(k_a)} & \cdots & 0 & 0 & \cdots & 0 & 0 \\ 0 & A_p^{(k_a)} & A_{p-1}^{(k_a)} & \cdots & 0 & 0 & \cdots & 0 & 0 \\ 0 & 0 & A_p^{(k_a)} & \cdots & 0 & 0 & \cdots & 0 & 0 \\ 0 & 0 & 0 & \cdots & 0 & 0 & \cdots & 0 & 0 \\ \vdots & \vdots & \vdots & \vdots & \vdots & \vdots & \vdots & \vdots \\ 0 & 0 & 0 & \cdots & A_1^{(k_a)} & 0 & \cdots & 0 & 0 \\ 0 & 0 & 0 & \cdots & A_2^{(k_a)} & A_1^{(k_a)} & \cdots & 0 & 0 \\ \vdots & \vdots & \vdots & \vdots & \vdots & \vdots & \vdots & \vdots \\ 0 & 0 & 0 & \cdots & A_{p-1}^{(k_a)} & A_{p-2}^{(k_a)} & \cdots & 0 & 0 \\ 0 & 0 & 0 & \cdots & A_p^{(k_a)} & A_{p-1}^{(k_a)} & \cdots & A_1^{(k_a)} & 0 \\ 0 & 0 & 0 & \cdots & 0 & A_{B,p}^{(k_a)} & \cdots & A_{B,2}^{(k_a)} & A_{B,1}^{(k_a)} \end{bmatrix} \quad (20)$$

the received noisy signal vector $e$ can then be presented by $$e = Ad + n \quad (21)$$

where $d$ is given in Eq.(4), and $e$ is given in Eq.(9), respectively. The system matrix $A$ can be manipulated by the decoder 403 to make determination of the data symbol vector $d$ more efficient, and so decoder 403 creates a set of matrices and vectors defined as $$A_m = \begin{bmatrix} A_m^{(1)} \\ A_m^{(1)} \\ \vdots \\ A_m^{(k_a)} \end{bmatrix}, \ A_{B,m} = \begin{bmatrix} A_{B,m}^{(1)} \\ A_{B,m}^{(1)} \\ \vdots \\ A_{B,m}^{(k_a)} \end{bmatrix}, \ m = 1, \ldots, p \quad (22)$$

where $p$, the matrix partition parameter, is given in Eq.(12), $A_m^{(ka)}$ and $A_{B,m}^{(ka)}$ are given in Eq.(13) through Eq.(18). In order to properly reflect the re-arrangement of the concatenated system matrix, the received signal vector $e$ and noise vector $n$ must correspondingly be re-arranged as:

$$r_n^{(k_a)} = \left[ e_{(n-1)Q+1}^{(k_a)} \ \cdots \ e_{nQ}^{(k_a)} \right]^T, n = 1, \ldots, N-1, \quad (23)$$

$$r_N^{(k_a)} = \left[ e_{(N-1)Q+1}^{(k_a)} \ \cdots \ e_{NQ+W-1}^{(k_a)} \right]^T$$

$$r_n = \left[ r_n^{(1)T} \ r_n^{(2)T} \ \cdots \ r_n^{(K_a)T} \right]^T, n = 1, \ldots, N \quad (24)$$

$$w_n^{(k_a)} = \left[ n_{(n-1)Q+1}^{(k_a)} \ \cdots \ n_{nQ}^{(k_a)} \right]^T, n = 1, \ldots, N-1, \quad (25)$$

$$w_N^{(k_a)} = \left[ n_{(N-1)Q+1}^{(k_a)} \ \cdots \ n_{NQ+W-1}^{(k_a)} \right]^T$$

$$w_n = \left[ w_n^{(1)T} \ w_n^{(2)T} \ \cdots \ w_n^{(K_a)T} \right]^T, n = 1, \ldots, N \quad (26)$$

allowing the modified data vector $r_n$ to be put in matrix form as $$r_n = \begin{cases} \sum_{m=2}^{n} A_m d_{n-m+1} + A_1 d_n + w_n & n = 1, \ldots, p \\ \sum_{m=2}^{p} A_m d_{n-m+1} + A_1 d_n + w_n & n = p+1, \ldots, N-1 \\ \sum_{m=2}^{p} A_{B,m} d_{N-m+1} + A_{B,1} d_N + w_N & n = N \end{cases} \quad (27)$$

Additionally by defining $u_n$ as:

$$u_n = \begin{cases} r_n - \sum_{m=2}^{n} A_m d_{n-m+1} & n = 1, \ldots, p \\ r_n - \sum_{m=2}^{p} A_m d_{n-m+1} & n = p+1, \ldots, N-1 \\ r_n - \sum_{m=2}^{p} A_{B,m} d_{N-m+1} & n = N \end{cases} \quad (28)$$

the sub-system equation representing the relation between the transmitted symbols and the observed signals can be finally expressed as:

$$u_n = \begin{cases} A_1 d_n + w_n, & n = 1, \ldots, N-1 \\ A_{B,1} d_n + w_n, & n = N \end{cases} \quad (29)$$

where $A_1$ and $A_{B,1}$ given in Eq.(22) form the corresponding sub-system matrices. In the embodiment of the present invention, two iteration procedures are proposed for estimating the transmitted data symbol vector $d$ based on the sub-system form of Eq.(29); one is called forward propagation multiuser joint detection (FPMJD), the other is called forward-backward propagation multiuser joint detection (FBPMJD). In the following sections, the two procedures are described separately in detail.

Forward Propagation Multiuser Joint Detection (FPMJD) Technique

Prior to describing the preferred embodiment of FPMJD, the following discussion sets out a necessary background for FPMJD analysis.

Assume that $M^{(FP)}$ is a forward propagation estimate operator. When a zero-forcing (ZF) criteria is considered, $M^{(FP)}$ is defined as:

$$M_{ZF}^{(FP)} = (A_1^H A_1)^{-1} A_1^H$$

$$M_{B,ZF}^{(FP)} = (A_{B,1}^H A_{B,1})^{-1} A_{B,1}^H \quad (30)$$

where $M_{ZF}^{(FP)}$ is used for estimating $d_n$, n=1, ..., N−1, while $M_{B,ZF}^{(FP)}$ is used for estimating $d_N$, respectively,
According to Eq(29), if $u_n$ is known, $d_n$ can be obtained by $$\hat{d}_{n,ZF} = \begin{cases} M_{ZF}^{(FP)} u_n & n = 1, \ldots, N-1 \\ M_{B,ZF}^{(FP)} u_n & n = N \end{cases} \quad (31)$$

However, as stated in Eq.(29), the vectors $u_n$, n=1, ..., N, are dependent on prior data symbols. By iteratively substituting the prior estimated data symbols $\hat{d}_m$, m=n−min{n−1, p−1}, ..., n−1, an estimate $\hat{u}_n$, n=1, ..., N, of $u_n$ can be obtained by decoder 403, i.e., $$\hat{u}_n = \begin{cases} r_n - \sum_{m=2}^{n} A_m \hat{d}_{n-m+1} & n = 1, \ldots, p \\ r_n - \sum_{m=2}^{p} A_m \hat{d}_{n-m+1} & n = p+1, \ldots, N+1 \\ r_n - \sum_{m=2}^{p} A_{B,m} \hat{d}_{N-m+1} & n = N \end{cases} \quad (32)$$

The estimated ZF solution of the system in Eq.(29) can be obtained by $$\hat{d}_{n,ZF} = \begin{cases} M_{ZF}^{(FP)} \hat{u}_n & n = 1, \ldots, N-1 \\ M_{B,ZF}^{(FP)} \hat{u}_n & n = N \end{cases} \quad (33)$$

In the preferred embodiment of the present invention it can also be assumed that the noise and the transmitted symbols are uncorrelated, i.e., the noise covariance matrix, denoted as $R_n$, and the transmitted symbol covariance matrix, denoted as $R_d$, are in the form of $$R_n = \sigma_n^2 I \quad R_d = \sigma_d^2 I \quad (34)$$

where I is the identity matrix, $\sigma_n^2$ and $\sigma_d^2$ are the noise and symbol variances, respectively.

When a minimum meansquare (MMSE) criteria is considered, the MMSE estimate operator $M^{(FP)}$ is defined as:

$$M_{MMSE}^{(FP)} = \left( A_1^H A_1 + \frac{\sigma_n^2}{\sigma_d^2} I \right)^{-1} A_1^H \quad (35)$$

$$M_{B,MMSE}^{(FP)} = \left( A_{B,1}^H A_{B,1} + \frac{\sigma_n^2}{\sigma_d^2} I \right)^{-1} A_{B,1}^H$$

Similarily to the previously decided zero-forcing operator, $M_{MMSE}^{(FP)}$ is used for estimating $d_n$, n=1, ..., N−1, and $M_{B,MMSE}^{(FP)}$ is used for estimating $d_N$, respectively. The MMSE solutions of the system in Eq.(29) can be obtained by $$\hat{d}_{n,MMSE} = \begin{cases} M_{MMSE}^{(FP)} \hat{u}_n & n = 1, \ldots, N-1 \\ M_{B,MMSE}^{(FP)} \hat{u}_n & n = N \end{cases} \quad (36)$$

In the preferred embodiment therefore, decoder 403 utilizes a FPMJD iterative procedure to estimate $d_n$ as follows:
1) for n=1... N, get $\hat{u}_n$ from $r_n$ and estimated $\hat{d}_m$, m=n−min{n−1, p−1}, ..., n−1, (Eq.(32))
2) calculate the current estimation of $d_n$ through $\hat{d}_n = M^{(FP)} \hat{u}_n$ (Eq.(33) or Eq.(36))
where $M^{(FP)}$ is the estimate operator defined in Eq.(30) or Eq.(35).

This above described technique results in an estimate of $\hat{d}_n$, n=1, ..., N with a slight loss of system performance due to the fact that detection of each symbol is based on a local and not global least-square or minimum-mean square criterion. To improve the system performance, in another embodiment of the present invention a technique called forward-backward propagation (FBP) is utilized by decoder 403. This technique is described below.

Forward-Backward Propagation Multi-User Joint Detection (FBPMJD)

Prior to describing the preferred embodiment of FBPMJD, the following discussion sets out a necessary background for FBPMJD analysis. First, constructing, $$B = \begin{bmatrix} A_1 \\ A_2 \end{bmatrix}, B_B = \begin{bmatrix} A_{B,1} \\ A_{B,2} \end{bmatrix} \quad (37)$$

where, $A_1$, $A_2$, $A_{B,1}$, and $A_{B,2}$ are given in Eq.(22), and let $$x_n = \begin{bmatrix} w_{n-1} \\ w_n \end{bmatrix}, n = 2, \ldots, N \quad (38)$$

$$z_n = \hat{u}_n - A_1 \hat{d}_n + A_2 \hat{d}_{n-1} \quad (39)$$

$$a_n = \begin{bmatrix} \hat{u}_{n-1} \\ z_n \end{bmatrix}, n = 2, \ldots, N \quad (40)$$

where $w_n$, n=1, ..., N, is given in Eq.(25) and Eq.(26), and $\hat{u}_n$, n=1, ..., N, is given in Eq.(32), respectively. The vector $a_n$ can be put in matrix form $$a_n = \begin{cases} Bd_{n-1} + x_n, & n = 2, \ldots, N-1 \\ B_B d_{n-1} + x_n, & n = N \end{cases} \quad (41)$$

The system in Eq.(41) characterizes a backward propagation procedure for data symbol estimation, so the data symbol estimation operator of the system is called a backward propagation estimate operator denoted as $M^{(BP)}$.

Now if a zero-forcing (ZF) criteria is considered for data estimation, the backward propagation estimate operator $M^{(BP)}$ can be defined as $$M_{ZF}^{(BP)} = (B^H B)^{-1} B^H \quad (42)$$

$$M_{B,ZF}^{(BP)} = (B_B^H B_B)^{-1} B_B^H$$

where $M_{ZF}^{(BP)}$ is used for estimating $d_n$, n=1, ..., N−2, and $M_{B,ZF}^{(BP)}$ is used for estimating $d_{N-1}$, respectively,
According to Eq(41), the backward propagation zero-forcing estimate of $d_n$, n=1, ..., N−1, can be obtained by $$\hat{d}_{n-1,ZF}^{(BF)} = \begin{cases} M_{ZF}^{(BP)} a_n & n = 2, \ldots, N-1 \\ M_{B,ZF}^{(BP)} a_n & n = N \end{cases} \quad (43)$$

Similarily, assume that the noise covariance matrix $R_n$, and the transmitted symbol covariance matrix $R_d$ are given in Eq.(34), then the backward MMSE estimate operator can be defined as $$M_{MMSE}^{(BP)} = \left( B^H B + \frac{\sigma_n^2}{\sigma_d^2} I \right)^{-1} B^H \quad (44)$$

-continued $$M_{B,MMSE}^{(BP)} = \left(B_B^H B_B + \frac{\sigma_n^2}{\sigma_d^2} I\right)^{-1} B_B^H$$

and the backward propagation MMSE estimate of $d_n$, n=1, ..., N-1, are obtained by decoder 403 by solving:

$$\hat{\hat{d}}_{n-1,MMSE}^{(BF)} = \begin{cases} M_{MMSE}^{(BP)} a_n & n = 2, \ldots, N-1 \\ M_{B,MMSE}^{(BP)} a_n & n = N \end{cases} \quad (45)$$

Getting the solution from Eq.(43) or Eq.(45) is based on knowing vectors an, which, in the preferred embodiment, can be obtained by decoder 403 through the forward propagation procedure (FP). That is, solving Eq.(43) or Eq.(45) actually involves two procedures: the forward propagation procedure characterized by Eq.(29) and the backward propagation procedure characterized by Eq.(41). We hence call the resulted solution of Eq.(41) the forward-backward solution. The detailed description to get the forward-backward solution $$\hat{\hat{d}}_n, n = 1, \cdots, N,$$

through the forward-backward propagation procedure is presented as follows:

For n=1, N
    get $\hat{u}_n$ from $r_n$ and $\hat{d}_m$, m=n−min {n−1, p−1}. . . , n−1. (Eq.(32))
    get a forward propagation estimation of $d_n^{(k)}$. (Eq.(33) or Eq.(36))
    get $z_n$ from $\hat{u}_n$ and estimated $\hat{d}_m$, m=n−1, n. (Eq. (39))
    get $a_n$ from $\hat{u}_{n-1}$ and $z_n$. (Eq.(40))
    get a backward propagation estimation of $$\hat{\hat{d}}_{n-1}.$$

(Eq.(43) or Eq.(45))
    update the forward propagation solution:

$$\hat{d}_{n-1} = \hat{\hat{d}}_{n-1}$$

End
determine the last estimated data symbol:

$$\hat{\hat{d}}_N = \hat{d}_N$$

Unlike prior-art estimation procedures, the above-described joint estimation techniques (FPMJD and FBPMJD) result in less computational complexity. The results in receivers which are less costly and consume lower amounts of power when compared to prior-art joint detection receivers.

The descriptions of the invention, the specific details, and the drawings mentioned above, are not meant to limit the scope of the present invention. For example, although the above description was in the context of a reverse link, the invention may be applied equally to both forward and reverse links. Additionally, the above discussion referred to a generic burst structure comprising two distinct blocks of data symbols. Clearly both type-1 and type-2 TD-CDMA burst types are within the scope of the above discussion. Additionally, in order to support higher data rate services, it has been proposed that a single user may transmit on more than one timeslot with a frame, or may transmit more than one data symbol sequences (requiring more than a single spreading code to be allocated to that user). Nevertheless, it is intended that the present invention encompass any data symbol sequence that may be utilized. It is the intent of the inventors that various modifications can be made to the present invention without varying from the spirit and scope of the invention, and it is intended that all such modifications come within the scope of the following claims.

What is claimed is:

1. An apparatus for detection of data signals from a transmitted signal in a Time-Division, Code-Division Multiple Access (TD-CDMA) communication system, the transmitted signal comprising a plurality of time overlapping coded signals transmitted from individual remote units, each coded signal transmitted within the same timeslot and distinguishable only by a specific encoding, the apparatus comprising:

a channel estimator having the transmitted signal as an input and outputting a midamble portion of the transmitted signal;

a convolutional coder having the midamble portion of the transmitted signal as an input and outputting a set of vectors representative of the transmitted signal; and a decoder having the set of vectors as an input and outputting symbol information for an individual remote unit's transmission, the symbol information being a solution to a set of sub-system matrices derived from a system matrix via a recursive procedure, wherein the recursive procedure propagates estimated data symbols in only the forward or both the forward and backward directions as a means of refining the symbol information;

wherein the system matrix is represented by the equation $$u_n = \begin{cases} A_1 d_n^+ w_n, & n = 1, \cdots, N-1 \\ A_{B,1} d_n^+ w_n, & n = N \end{cases}$$

wherein $u_n$ is a vector comprising the received signals and some prior estimated data symbols $A_1$ and $A_{B,1}$ is are subsystem matrices, $w_n$ is noise, and $d_n$ are data symbols to be estimated.

2. In a communication system utilizing Direct-Sequence, Spread-Spectrum (DS-SS) techniques for the transmission of signals, a method for determining an individual user's transmitted data from a received signal, the method comprising the steps of:

representing the received signal as a system matrix, wherein the system matrix is represented by the equation $$u_n = \begin{cases} A_1 d_n + w_n, & n = 1, \ldots, N-1 \\ A_{B,1} d_n + w_n, & n = N \end{cases}$$

wherein $u_n$ is a vector comprising the received signals and some prior estimated data symbols $A_1$ and $A_{B,1}$ is are subsystem matrices, $w_n$ is noise, and $d_n$ are data symbols to be estimated;

partitioning the system matrix into sub-matrices to form a plurality of sub-system matrices;

solving the plurality of sub-system matrices via a recursive forward or forward-backward procedure to determine the individual user's data from the transmitted signal; and transmitting the individual user's data to infrastructure equipment for further processing of the user's data.

3. In a Time-Division, Code-Division Multiple Access (TD-CDMA) communication system, where a transmitted signal comprises a plurality of time overlapping coded signals transmitted from individual remote units, each coded signal transmitted within a same timeslot and distinguishable only by a specific encoding, a method for determining an individual user's transmitted data from a received signal, the method comprising the steps of:

extracting a midamble portion of the transmitted signal;

convolutionally encoding the midamble portion of the transmitted signal to produce a set of vectors representative of the transmitted signal;

representing the convolutionally encoded midamble portion of the transmitted signal as a system matrix wherein the system matrix is represented by the equation $$u_n = \begin{cases} A_1 d_n + w_n, & n = 1, \ldots, N-1 \\ A_{B,1} d_n + w_n, & n = N \end{cases}$$

wherein $u_n$ is a vector comprising the received signals and some prior estimated data symbols $A_1$ and $A_{B,1}$ is are subsystem matrices, $w_n$ is noise, and $d_n$ are data symbols to be estimated;

partitioning the system matrix into sub-matrices forming a plurality of sub-system matrices;

solving the plurality of sub-system matrices via a recursive forward or forward-backward procedure to determine the individual user's data from the transmitted signal; and transmitting the individual user's data to infrastructure equipment for further processing of the user's data.

* * * * *